(12) United States Patent
Eusebi

(10) Patent No.: US 6,655,718 B2
(45) Date of Patent: Dec. 2, 2003

(54) SAFETY RESTRAINT DEVICE FOR POLICE VEHICLE

(75) Inventor: Christopher A. Eusebi, Bloomfield Township, MI (US)

(73) Assignee: CEE Restraint Systems, Inc.

( * ) Notice: Subject to any disclaimer, the term of this patent is extended or adjusted under 35 U.S.C. 154(b) by 2 days.

(21) Appl. No.: 09/941,887

(22) Filed: Aug. 28, 2001

(65) Prior Publication Data
US 2003/0042724 A1 Mar. 6, 2003

(51) Int. Cl.⁷ .............................................. B60R 22/48
(52) U.S. Cl. ................... 280/801.1; 280/806; 280/808; 297/464; 297/480
(58) Field of Search ............................... 280/806, 808, 280/748, 749, 801.1; 297/464, 480

(56) References Cited

U.S. PATENT DOCUMENTS

| 3,819,197 | A | * | 6/1974 | Shakespear | 280/806 |
| 3,963,273 | A | * | 6/1976 | Nagazumi | 280/806 |
| 4,811,912 | A | * | 3/1989 | Takada | 242/382.2 |
| 4,915,413 | A | * | 4/1990 | Meyer | 280/808 |
| 5,280,995 | A | * | 1/1994 | Elton | 280/808 |
| 5,494,316 | A | * | 2/1996 | Maesing et al. | 280/808 |
| 5,799,894 | A | * | 9/1998 | Kohlndorfer et al. | 280/806 |
| 5,831,342 | A | * | 11/1998 | Vivacqua et al. | 280/735 |
| 5,992,884 | A | * | 11/1999 | Gillespie et al. | 280/808 |
| 6,116,696 | A | * | 9/2000 | Widman et al. | 280/808 |
| 6,305,713 | B1 | * | 10/2001 | Pywell et al. | 280/806 |
| 6,334,628 | B1 | * | 1/2002 | Newball et al. | 280/808 |
| 6,338,502 | B1 | * | 1/2002 | Czank | 280/808 |

FOREIGN PATENT DOCUMENTS

| DE | 4001119 | A1 | * | 7/1991 | B60R/22/20 |
| FR | 2667032 | A | * | 3/1992 | B60R/22/02 |
| JP | 63130448 | A | * | 6/1988 | B60R/22/24 |
| JP | 63130449 | A | * | 6/1988 | B60R/22/24 |
| JP | 63242754 | A | * | 10/1988 | B60R/22/32 |

* cited by examiner

Primary Examiner—Paul N. Dickson
Assistant Examiner—Toan C To

(57) ABSTRACT

The method and device of this invention immobilizes a person in a secure, upright restraint system in a police vehicle. It can be easily and safely applied by public safety officers including police or other law enforcement personnel and medical personnel to secure a person against undesired movement while maintaining them in an upright, sitting position which leaves the diaphragm free for natural, unrestrained breathing movement. The asphyxia-preventing restraining device comprises an ALR/ELR retractor. The ALR/ELR retractor comprises a shoulder harness having a pair of seat belt buckles, which significantly reduce the possibilities of injuries to police officers.

11 Claims, 4 Drawing Sheets

SAFETY RESTRAINT DEVICE FOR POLICE VEHICLE

FIELD OF THE INVENTION

The present invention relates to a seat belt system for restraining a prisoner in a law enforcement vehicle.

BACKGROUND OF THE INVENTION

A seat belt system for restraining a seated prisoner in a law enforcement vehicle ordinarily includes seat belt webbing, a seat belt buckle, and a seat belt retractor. A locking tongue on the webbing is releasably lockable in the buckle when the webbing has been extracted from the retractor and moved to a position in which shoulder and lap belt sections of the webbing extend across the prisoner. If the vehicle experiences a crash, a locking mechanism in the retractor blocks further extraction of the webbing. The webbing then restrains movement of the prisoner to protect the prisoner from a forceful impact with parts of the vehicle as a result of the crash.

Often, however, seat belts in police vehicles are simply not used. This is due to the location of the belt system within a police vehicle, which places the retractor mounted outboard of the prisoner and the buckle is positioned inboard of the prisoner. Police officers are under considerable risk of injury should they belt the prisoner. Injuries to the police officer can be caused by the prisoner biting, kicking, or head butting the police officer while the officer reaches over the prisoner to buckle him. As such, the belt in police vehicles are rarely used. As a result, a significant liability risk exists for municipalities which may be found responsible for injuries caused to a prisoner during a vehicle accident.

Seat belt retractors fall into two broad categories. The first being an emergency locking retractor (ELR) which is activated only during an emergency to prevent protraction of the seat belt (webbing) wound about a spool of the retractor. This type of retractor includes various known sensors such as a web sensor with initiates the locking of the spool when the webbing is pulled at a rate above a designated level and a vehicle or inertia sensor sensitive to levels of vehicle deceleration to bring the spool into a locked condition. The second type of retractor is one which is brought into a locked condition after a determinable length of webbing has been protracted. Once this length of webbing has been protracted, the retractor spool is automatically in its locked condition preventing further protraction of the webbing. This type of retractor is often referred to as an automatic locking retractor (ALR). The ALR retractor is reset once the webbing is fully retracted upon the spool. The ALR function has also been incorporated into an ELR retractor. This type of retractor includes a mode switching mechanism to switch the retractor from operating as an ELR to one that operates as an ALR retractor.

This mode switching mechanism can take many forms such as a feeler bar that rides upon the webbing coiled upon the spool. As the webbing is protracted, the feeler bar rotates inwardly and at some angle, indicative of an amount of webbing protracted from the retractor. The feeler bar causes a lock pawl to be moved into engagement with the lock teeth of the retractor. A more complex mode switching mechanism can be realized using a series of gears which rotate with the spool and, at a predetermined position, of one or more of these gears activate a lever to cause a lock pawl to engage a lock teeth of the retractor.

This ELR/ALR retractor operates as an ELR retractor during an emergency and acts as an ALR once the seat belt webbing has been protracted a determinable length. A retractor with an ALR feature has proven useful in securing a child seat to the vehicle seat. After the child seat is in place upon the vehicle seat, the webbing is fully protracted from the retractor, activating the mode switching mechanism. After the latch plate (also referred to as a tongue) is secured into its buckle, the webbing is released and rewound into the retractor by its rewind spring. Once this occurs the webbing is pulled tight about the child seat. Since the retractor is now in its ALR mode of operation the webbing is prevented from protracting during an emergency, and, as such, the child seat is held securely upon the seat.

SUMMARY OF THE INVENTION

In accordance with the present invention, a prisoner restraint system for a law enforcement vehicle restrains the seated prisoner's movement. The system restrains kicking movement by restraining movement of the prisoner's feet upward from positions resting on the vehicle floor, and also by restraining forward movement of the prisoner's feet. The system includes seat belt webbing, a seatbelt retractor, a first and second seat belt buckles, a seat belt locking tongue, and has an engaged condition in which the tongue is interlocked with the first seat belt buckle to position the seatbelt in a position convenient for an officer's use and in the second buckle to restrain the prisoner.

A primary object of the present invention is to provide an ALR/ELR seat belt retractor which has a mode switching mechanism, the mode switching of which can be used as a means to control the movement of a prisoner in a vehicle seat. A further object of the invention is to provide a safety restraint system that has a switch or sensing means which will detect the change of operational mode from the ELR mode to ALR mode, indicative of the fact that the webbing has been secured about a prisoner seat and provide a signal which will be used to vary the output of a lamp. Other objects, features, and advantages will become apparent from the following description and appended claims.

Accordingly, the invention includes a seat belt retractor having a mode switching mechanism capable of transforming the retractor to operate as an ALR or ELR retractor. The system provides a center mounted seatbelt retractor and a pair of seatbelt buckles. The first buckle is placed in a forward location in the vehicle compartment. The second buckle is placed in a location adjacent the vehicle seat. A sensing means capable of detecting the mode of operation of the retractor and to provide a signal, which can be used to modify the output of a warning lamp is provided.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF PREFERRED EMBODIMENT

Figure 1:
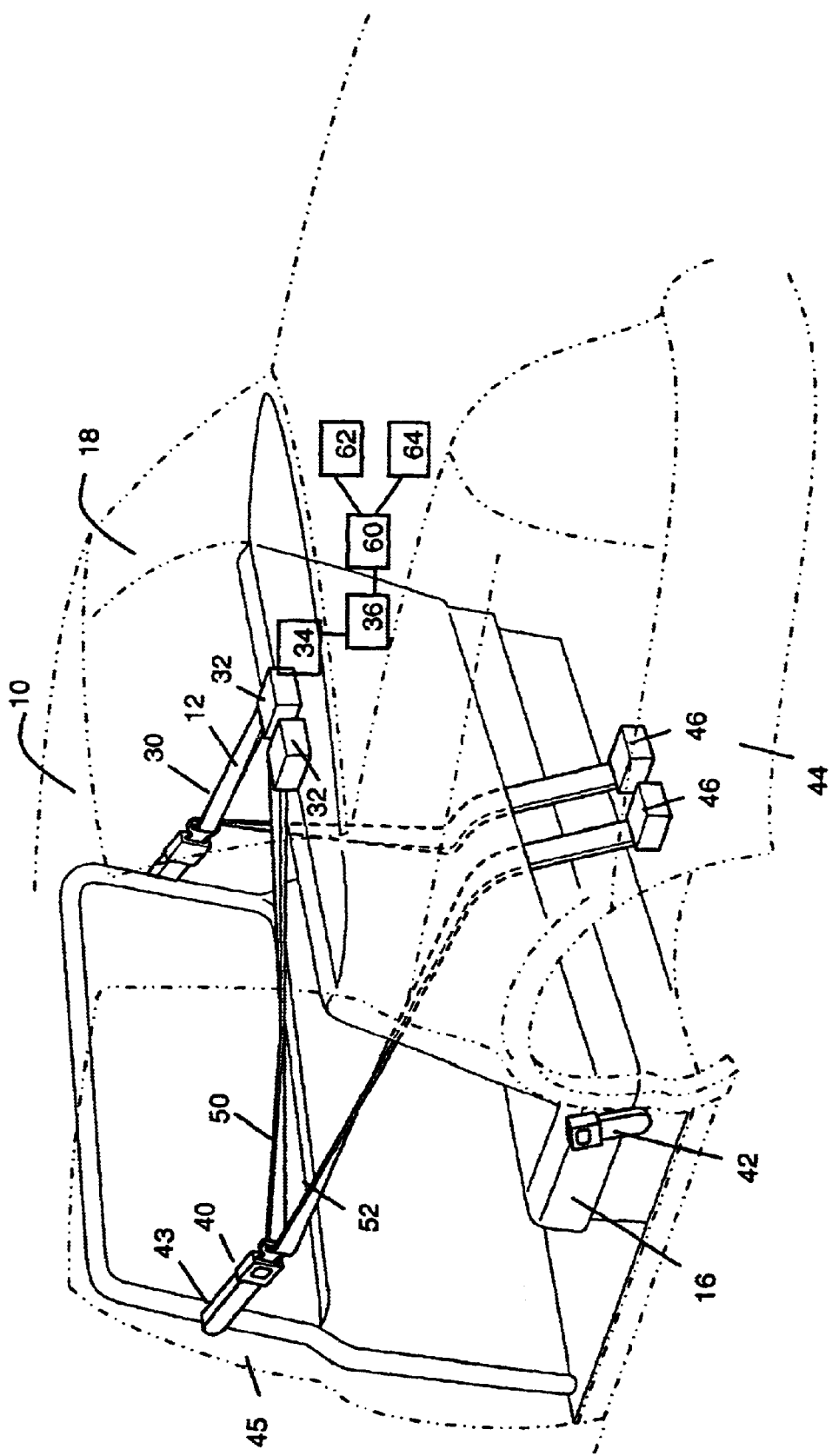
FIG. 1 is a perspective view of the seatbelt system of the present invention in a police vehicle.

An apparatus 10 comprising a preferred embodiment of the present invention is shown in FIG. 1. The apparatus 10 includes vehicle occupant restraint system 12 for a rear seat 16 of a vehicle 18. The vehicle 18 is a law enforcement vehicle such as an automobile, truck, van, or the like which is used to transport prisoners. The first restraint system 12 is a three-point seat belt system for restraining an occupant of the seat 16 upon the occurrence of a vehicle crash. Accordingly, the restraint system 12 can continuously restrain a seated prisoner 17 so that the prisoner can move within the vehicle without causing damage to himself, the adjacent door, window, front seat, or security grill.

Figure 2:
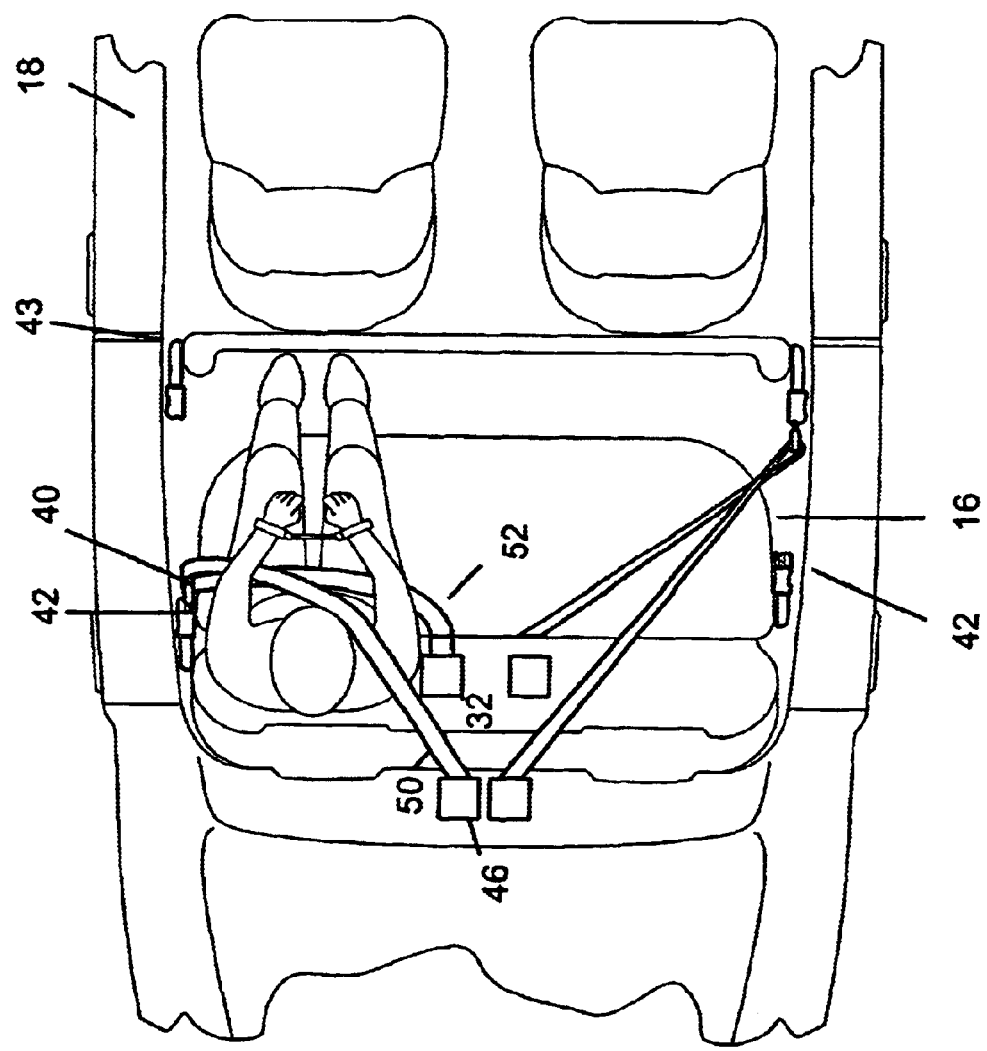
FIG. 2 is a top view of apparatus of FIG. 1 in a police vehicle.

The restraint system 12 includes seat belt webbing 30 and a seat belt retractor 32 for the webbing 30. As is shown schematically in FIG. 2, the retractor 32 has a spool 34 upon which the webbing 30 is wound. A rewind spring 36 biases the spool 34 to rotate in a winding direction. The webbing 30 is movable back and forth between a fully retracted position and a fully extracted position upon winding and unwinding of the webbing 30 on the spool 34.

The first restraint system 12 further includes a seat belt locking tongue 40 and a first seat belt buckle 42. The tongue 40 is preferably slidable along the length of the webbing 30, and is releasably lockable in the first buckle 42. The buckle 42 is anchored directly to the seat 16, or directly to the vehicle floor 44, in a known manner. The second buckle 43 is placed at the adjacent door b-pillar 45, front seat, or security grill.

When the webbing 30 is in a first position, it extends upward from the retractor 32 to the second buckle 43 and then to an anchor 46, as shown in FIG. 1. The anchor 46 fixes the webbing 30 to the seat 16 or to the floor 44 in a known manner. When the webbing 30 is in the second position, shown in FIG. 2, it is extracted from the retractor 32 sufficiently to enable the tongue 40 to reach the first buckle 42. A shoulder belt section 50 of the webbing 30 then extends across the seat 16 from the retractor 32 to the tongue 40. A lap belt section 52 of the webbing 30 extends across the seat 16 from the anchor 46 to the tongue 40.

The rewind spring 36 in the retractor 32 is stressed as the spool 34 rotates in an unwinding direction when the webbing 30 is being extracted from the retractor 32 and the tongue 40 is being moved toward the buckle 42. When the tongue 40 is released from the buckle 42, the rewind spring 36 rotates the spool 34 in the winding direction to retract the webbing 30 into the retractor 32, and thereby to move the webbing 30 back to the fully retracted position.

The retractor 32 further includes a locking assembly 60. The locking assembly 60 blocks further extraction of the webbing 30 when the webbing 30 is required to restrain the occupant of the seat 16. Preferably, the locking assembly 60 includes both an emergency locking mechanism 62 and an automatic locking mechanism 64. The emergency locking mechanism 62 blocks unwinding rotation of the spool 34 in response to an emergency condition such as, for example, vehicle roll-over, sudden vehicle deceleration, or sudden extracting movement of the webbing 30. The automatic locking mechanism 64, which is sometimes referred to as a cinch mechanism, continuously blocks unwinding rotation of the spool 34. Such an automatic locking mechanism may be actuated in response to extraction of the webbing 30, locking of the tongue 40 in the buckle 42, or any other condition indicating that an occupant of the seat is wearing the webbing 30 for protection upon the occurrence of a vehicle crash.

When the first webbing section 50 is in its first retracted position, as shown in FIG. 1, it preferably extends outward from beneath the seat 16 only far enough for the tongue 80 to be easily accessible to a law enforcement officer reaching into the vehicle 18 across a seated prisoner. When the first webbing section 50 is in the extracted position shown in FIG. 2, it extends outward from beneath the seat 16 sufficiently for the tongue 40 to be locked in the buckle 43 at the end of the second webbing section 52.

Figure 4:
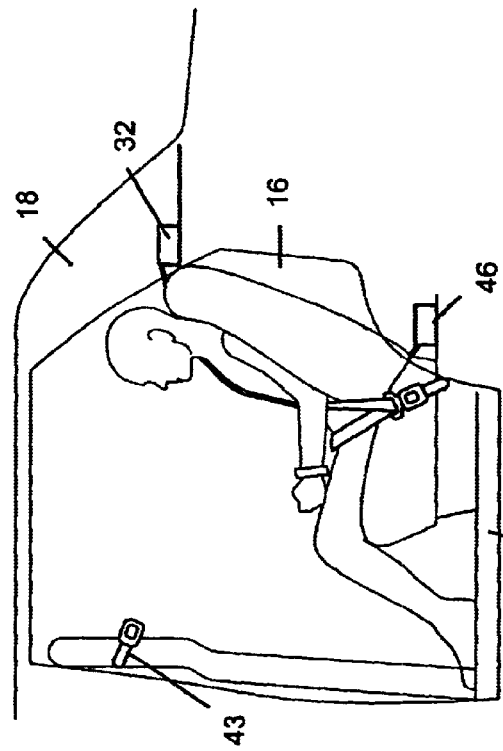
FIGS. 3 and 4 represent a schematic views of other apparatus of the present invention.
Figure 3:
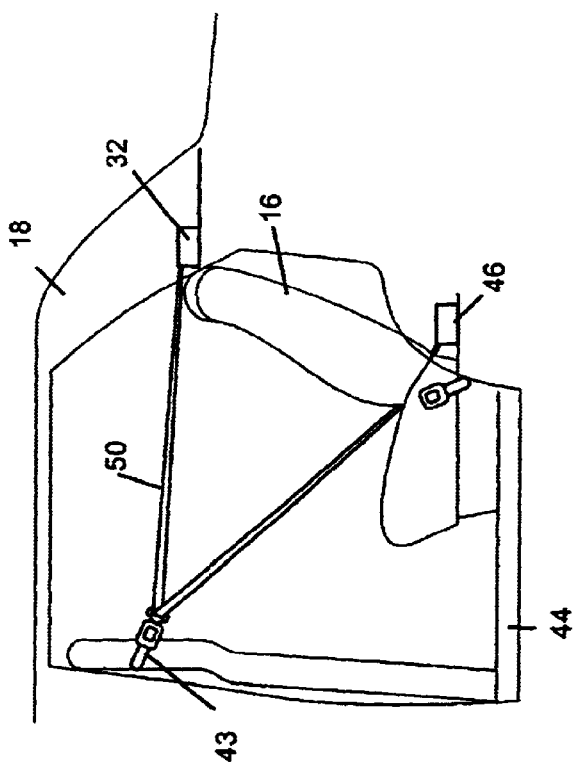
Figure 5:
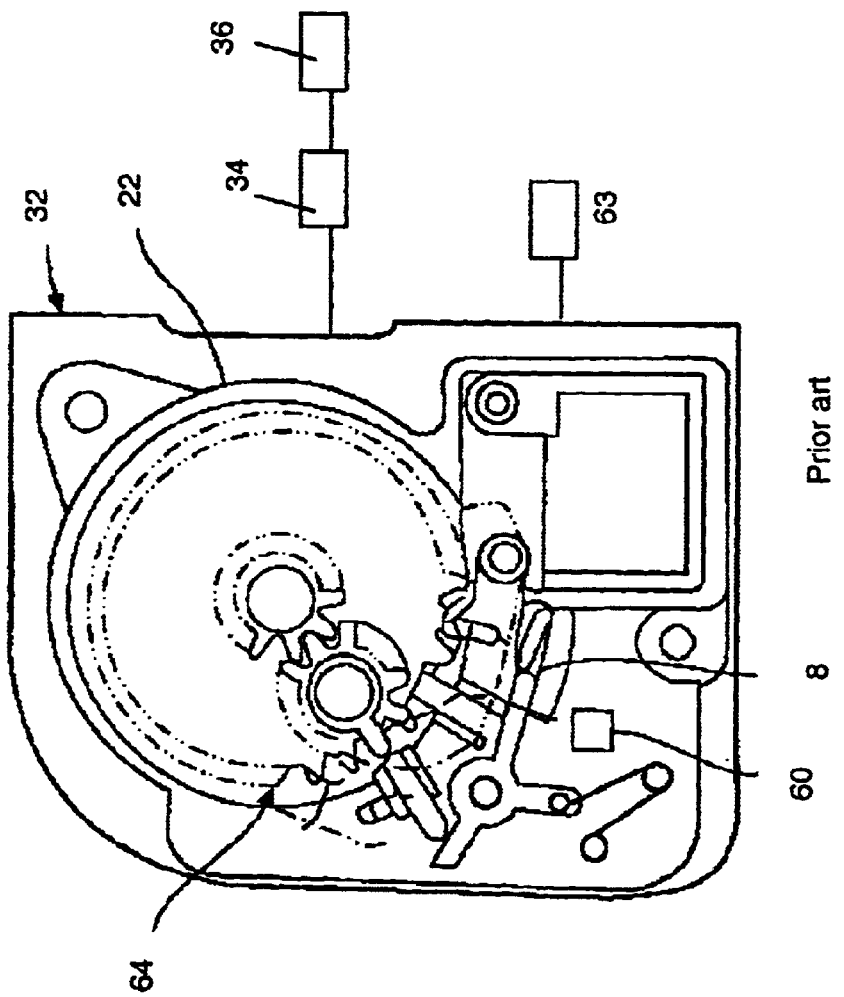
FIG. 5 is a seatbelt retractor according to the teachings of the present invention.

In accordance with a particular feature of the present invention, the first buckle 42 is located on the outboard side of the seated prisoner 17 when the restraint system 12 is in the engaged condition of FIG. 4. This ensures that the first buckle 42 is easily accessible to a law enforcement officer reaching into the vehicle 18 to unlock the tongue from the first buckle 42. FIG. 5 is illustrative of an ELR/ALR retractor 32 with a mode changing mechanism 22 shown in U.S. Pat. No. 4,811,912 which is incorporated herein by reference. This retractor 32 includes a gear mechanism 64, which rotates as the webbing is extracted from the retractor 32. At a predetermined position, a lever-ratchet 8 of the mechanism 22 is caused to change position thus initiating a change in the mode of operation of the retractor. FIG. 5 also shows a sensing means 60 positioned proximate to the lever 8 to detect this change in position of the lever 8 (which is indicative of the change in operating mode from its ELR mode to its ALR mode).

The following describes the operation of the invention. The seatbelt is placed into its first position by locking the tongue 80 into the first buckle 42. The webbing of the retractor is extended. As the webbing is protracted the retractor spool rotates moving the gears of the mode switching mechanism to the point the ALR mechanism 64 is engaged. The prisoner 17 is first placed on the vehicle seat 16. As the webbing is protracted the retractor spool rotates moving the gears of the mode switching mechanism. With the webbing extended the lever 8 is caused to move placing the retractor 32 in its ALR mode of operation. Thereafter the webbing is released and is rewound upon the retractor spool drawing the webbing 30 tightly. The tongue 80 is released from the first buckle and inserted into the second buckle 1. Thereafter the webbing is again released and is rewound upon the retractor spool drawing the webbing 29 tightly around the prisoner 17. Optionally, the movement of the lever 8 is sensed by the switch mean 60 and communicated to and used by the control unit 29 to display a light visible to the police officer showing the status of the system.

From the above description of the invention, those skilled in the art will perceive improvements, changes and modifications. Such improvements, changes and modifications within the skill of the art are intended to be covered by the appended claims.

I claim:

1. A police vehicle having a rear passenger compartment configured to transport a prisoner comprising:
    a vehicle seat within the rear passenger compartment having a center mount location;
    a retractor disposed at the center mount location, including a mode switching mechanism capable of changing the mode of operation of the retractor between an automatic locking retractor mode and an emergency locking retractor mode in response to an amount of seat belt webbing extracted from the retractor;
    seat belt webbing operatively coupled to said retractor;
    a seat belt tongue coupled to said seat belt webbing; and
    wherein the rear passenger compartment defines a first coupling position located adjacent to the vehicle seat and a second forward position coupling, said first and second coupling positions being configured to mate with the tongue and wherein the retractor is configured to resist movement of the prisoner while the seat belt tongue is in the second location and the retractor is in the automatic locking retractor mode.

2. The police vehicle as defined in claim 1 further comprising a first seatbelt buckle disposed at the first coupling position; and a second seatbelt buckle disposed at said second coupling position.

3. The police vehicle as defined in claim 1 wherein said second coupling position is located at a b-pillar of the vehicle.

4. The police vehicle as defined in claim 2 said first seat belt buckle is disposed adjacent said seat.

5. The police vehicle as defined in claim 1 wherein when the tongue is in the first position, the webbing extends upward from the retractor to the second buckle and then to an anchor.

6. The police vehicle as defined in claim 5 when the tongue is in the second position, the webbing has a chest portion which is extracted so as to extend across the seat from the retractor, the belt further has a lap belt section which extends across the seat from the anchor to the tongue.

7. A method of restraining a prisoner on a vehicle seat within a rear passenger compartment of a vehicle having a forward first coupling position and a second coupling position located adjacent to the vehicle seat comprising the steps of: providing a prisoner restraint system having a retractor disposed at a center mount seat location, the retractor including a mode switching mechanism capable of changing the mode of operation of the retractor between an automatic locking retractor mode and an emergency locking retractor mode in response to an amount of seat belt webbing extracted from the retractor and seat belt webbing operatively coupled to said retractor, a seat belt tongue coupled to said seat belt webbing;

placing the prisoner on the vehicle seat;

placing the tongue at the second coupling position;

protracting the webbing from the retractor engage the automatic locking retractor mode;

releasing the webbing so as to restrain the prisoner against the vehicle seat.

8. The method according to claim 7 comprising the step of coupling the tongue to a second coupling position forward of the seat.

9. The method according to claim 8 comprising the step of coupling the tongue to a first coupling position adjacent the vehicle seat.

10. The method according to claim 8 comprising the step of extracting the webbing to engage the automatic locking retractor mode.

11. The method according to claim 10 comprising the step of releasing the webbing to restrain the prisoner.

* * * * *